(12) United States Patent
Zhou et al.

(10) Patent No.: US 8,340,118 B2
(45) Date of Patent: Dec. 25, 2012

(54) SYSTEM AND METHOD FOR MULTIPLEXING FRACTIONAL TDM FRAMES

(75) Inventors: Xinkuan Zhou, Shekou (CN); Clifton Powers, Raleigh, NC (US); Laxman Anne, Eden Prairie, MN (US); Manish Sharma, Eden Prairie, MN (US); Joe Polland, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 756 days.

(21) Appl. No.: 12/468,562

(22) Filed: May 19, 2009

(65) Prior Publication Data

US 2009/0290583 A1    Nov. 26, 2009

Related U.S. Application Data

(60) Provisional application No. 61/055,353, filed on May 22, 2008.

(51) Int. Cl.
*H04B 7/212* (2006.01)

(52) U.S. Cl. ...................................................... 370/442

(58) Field of Classification Search .................. None
See application file for complete search history.

(56) References Cited

U.S. PATENT DOCUMENTS

| | | | |
|---|---|---|---|
| 5,452,306 A | 9/1995 | Turudic et al. | |
| 5,506,956 A * | 4/1996 | Cohen | 714/6.1 |
| 5,526,344 A | 6/1996 | Diaz et al. | |
| 5,768,278 A * | 6/1998 | Virdee et al. | 370/468 |
| 5,771,236 A | 6/1998 | Sansom et al. | |
| 5,812,786 A | 9/1998 | Seazholtz et al. | |
| 5,881,059 A | 3/1999 | Deschaine et al. | |
| 5,953,318 A | 9/1999 | Nattkemper | |
| 6,266,349 B1 | 7/2001 | Fukui | |
| 6,320,876 B1 | 11/2001 | Virdee et al. | |

(Continued)

FOREIGN PATENT DOCUMENTS

EP   0760563   3/1997

(Continued)

OTHER PUBLICATIONS

International Searching Authority, "International Search Report", Jan. 15, 2010, Published in: WO.

(Continued)

*Primary Examiner* — Otis L Thompson, Jr.
(74) *Attorney, Agent, or Firm* — Fogg & Powers LLC

(57) ABSTRACT

A multiplexing card comprises a primary TDM port over which TDM frames are communicated to and from a networking device, a plurality of secondary TDM ports over each of which fractional TDM frames are communicated to and from a plurality of digital subscriber line (DSL) units; and a logic device coupled between the primary TDM port and the plurality of secondary TDM ports, wherein the logic device is operable to map timeslots from each of the fractional TDM frames received over the plurality of secondary TDM ports to timeslots in a TDM frame communicated over the primary TDM port, and to map each of a plurality of blocks of timeslots in a TDM frame received over the primary TDM port to one of the plurality of secondary TDM ports; wherein the combined number of timeslots containing user data in the fractional TDM frames received over the plurality of secondary TDM ports is less than or equal to the maximum number of available timeslots in the corresponding TDM frame communicated over the primary TDM port.

18 Claims, 5 Drawing Sheets

U.S. PATENT DOCUMENTS

| | | |
|---|---|---|
| 6,781,985 B1 * | 8/2004 | Feder et al. ............... 370/376 |
| 6,954,463 B1 * | 10/2005 | Ma et al. .................. 370/401 |
| 6,963,561 B1 | 11/2005 | Lahat |
| 7,054,377 B1 | 5/2006 | Betts |
| 7,088,742 B2 | 8/2006 | Oliver et al. |
| 2002/0040381 A1 | 4/2002 | Steiger |
| 2003/0058847 A1 | 3/2003 | Pike |
| 2003/0123487 A1 * | 7/2003 | Blackwell et al. ......... 370/485 |
| 2004/0090985 A1 | 5/2004 | Burkle |
| 2004/0213170 A1 | 10/2004 | Bremer |
| 2004/0264683 A1 | 12/2004 | Bye |
| 2005/0100337 A1 | 5/2005 | DeCusatis et al. |
| 2005/0210157 A1 | 9/2005 | Sakoda |
| 2006/0233188 A1 * | 10/2006 | Oliver et al. ............... 370/442 |

FOREIGN PATENT DOCUMENTS

JP 09139723 5/1997

OTHER PUBLICATIONS

Rup et al., "SHDSL Technology Complementing Other Transport Technologies", "Eurocon 2003. Computer as a Tool. The IEEE Region 8", Sep. 22, 2003, pp. 229-232, vol. 1, Publisher: IEEE, Published in: Piscataway, NJ.

* cited by examiner

SYSTEM AND METHOD FOR MULTIPLEXING FRACTIONAL TDM FRAMES

CROSS-REFERENCE TO RELATED CASES

This application is related to the following co-pending United States patent applications, all of which are hereby incorporated herein by reference: U.S. patent application Ser. No. 12/468,552 entitled "MULTIPLE E-CARRIER TRANSPORT OVER DSL" filed on even date herewith and which is referred to herein as the '552 Application; U.S. patent application Ser. No. 11/566,493 entitled "POINT-TO-MULTIPOINT DATA COMMUNICATIONS WITH CHANNEL ASSOCIATED SIGNALING" filed on Dec. 4, 2006 and which is referred to herein as the '493 application; and U.S. provisional patent application Ser. No. 61/055,353, filed May 22, 2008 entitled "E1 TRANSPORT OVER G.SHDSL," and referred to herein as the "'353 application". The present application hereby claims priority, under 35 U.S.C. §119(e), to U.S. Provisional Patent Application No. 61/055,353.

BACKGROUND

Many telecommunications services utilize time division protocols such as E-carrier and T-carrier protocols. For example, E-carrier systems allocate bandwidth or timeslots for a voice call for the entire duration of the call. Thus, E-carrier systems provide high call quality since the bandwidth and system latency is constant and predictable. However, this also increases the cost of utilizing E-carrier systems due to the persistent allocation of bandwidth. In particular, individuals and small business often find the cost of an E-carrier service to be cost-prohibitive despite its benefits.

SUMMARY

In one embodiment, a multiplexing card for fractional time division multiplex (TDM) frames is provided. The multiplexing card comprises a primary TDM port over which TDM frames are communicated to and from a networking device, a plurality of secondary TDM ports over each of which fractional TDM frames are communicated to and from a plurality of digital subscriber line (DSL) units; and a logic device coupled between the primary TDM port and the plurality of secondary TDM ports, wherein the logic device is operable to map timeslots from each of the fractional TDM frames received over the plurality of secondary TDM ports to timeslots in a TDM frame communicated over the primary TDM port, and to map each of a plurality of blocks of timeslots in a TDM frame received over the primary TDM port to one of the plurality of secondary TDM ports; wherein the combined number of timeslots containing user data in the fractional TDM frames received over the plurality of secondary TDM ports is less than or equal to the maximum number of available timeslots in the corresponding TDM frame communicated over the primary TDM port.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
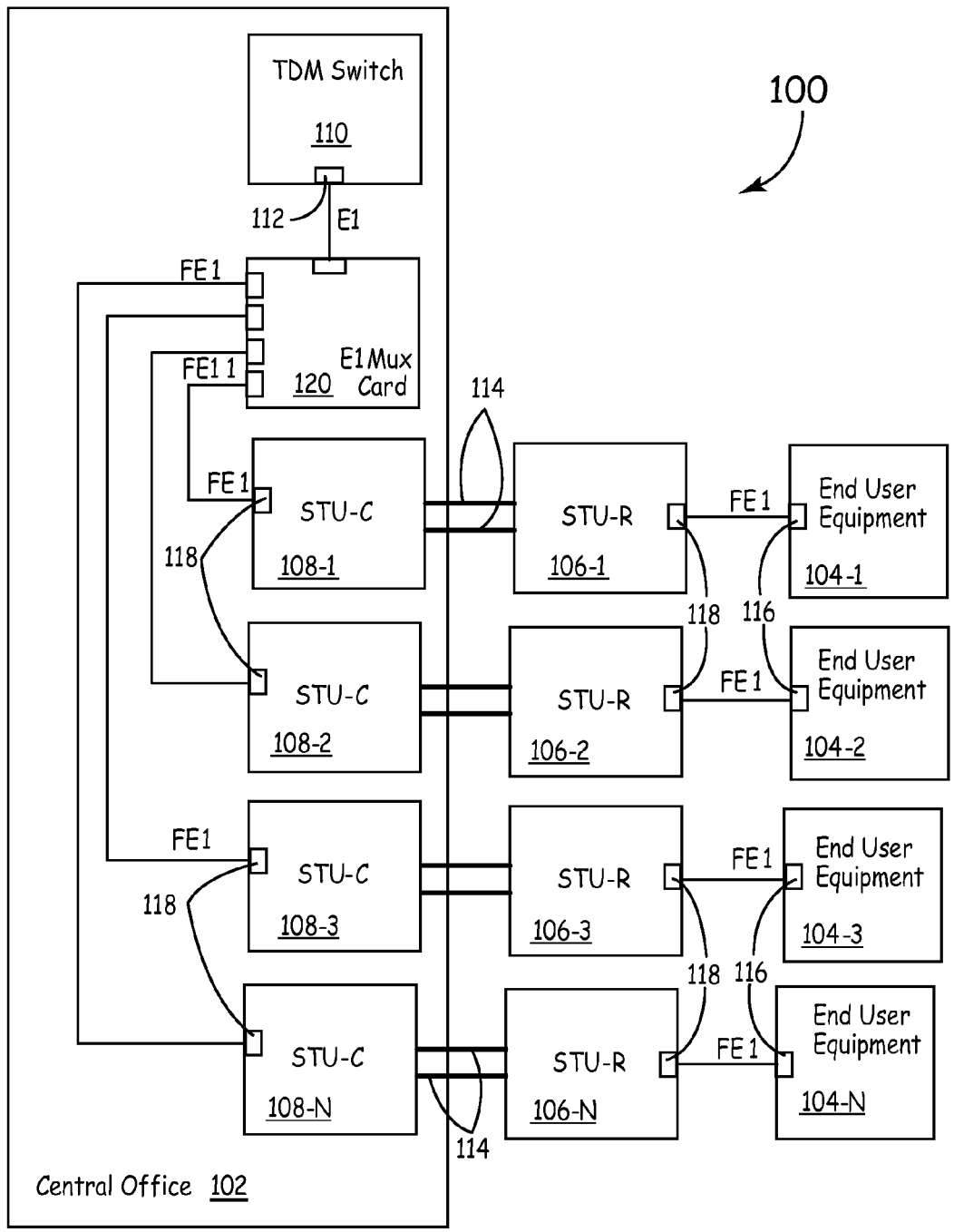
FIG. 1 is a block diagram of one embodiment of a communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of a communication system 100 that enables a plurality of end user equipment 104-1 . . . 104-N to communicate over a single Time Division Multiplex (TDM) port 112 in a networking device 110 at the central office 102. As used herein, a TDM port is a port configured to transmit and receive TDM frames. A TDM frame, as used herein, is a frame configured according to one of an E-carrier protocol and a T-carrier protocol. E-carrier and T-carrier protocols are known to one of skill in the art. In particular, the embodiments described herein implement the E1 protocol defined in the International Telecommunications Union (ITU) G.703 standard. However, it is to be understood that other E-carrier and T-carrier protocols can be used in other embodiments.

In addition, as used herein, a fractional TDM frame is a TDM frame in which less than the total number of available timeslots in the frame are used for carrying user data. For example, in embodiments using the E1 protocol, the fractional E1 frame contains 32 timeslots, but less than 32 timeslots are used for carrying data. The timeslots not used are also referred to herein as empty timeslots. The networking device 110 can be implemented as an Open Systems Interconnection (OSI) International Standards Organization (ISO) 3 networking device such as a bridge, switch, or router. For example, in this exemplary embodiment a TDM switch 110 is used.

Each end user equipment 104 transmits data, such as voice data, via a fractional E1 frame to a respective remote unit 106 (labeled as STU-R) for transmission to the central office 102. For example, each end user equipment 104 is a private branch exchange (PBX) in a business office in some embodiments. However, it is to be understood that, in other embodiments, other types of data can be used, such as, but not limited to, email and multimedia capture (image, video, sound). The fractional E1 port 116 of each end user equipment 104 is connected to an available E1 port connector 118 of a corresponding remote unit 106.

Figure 2:
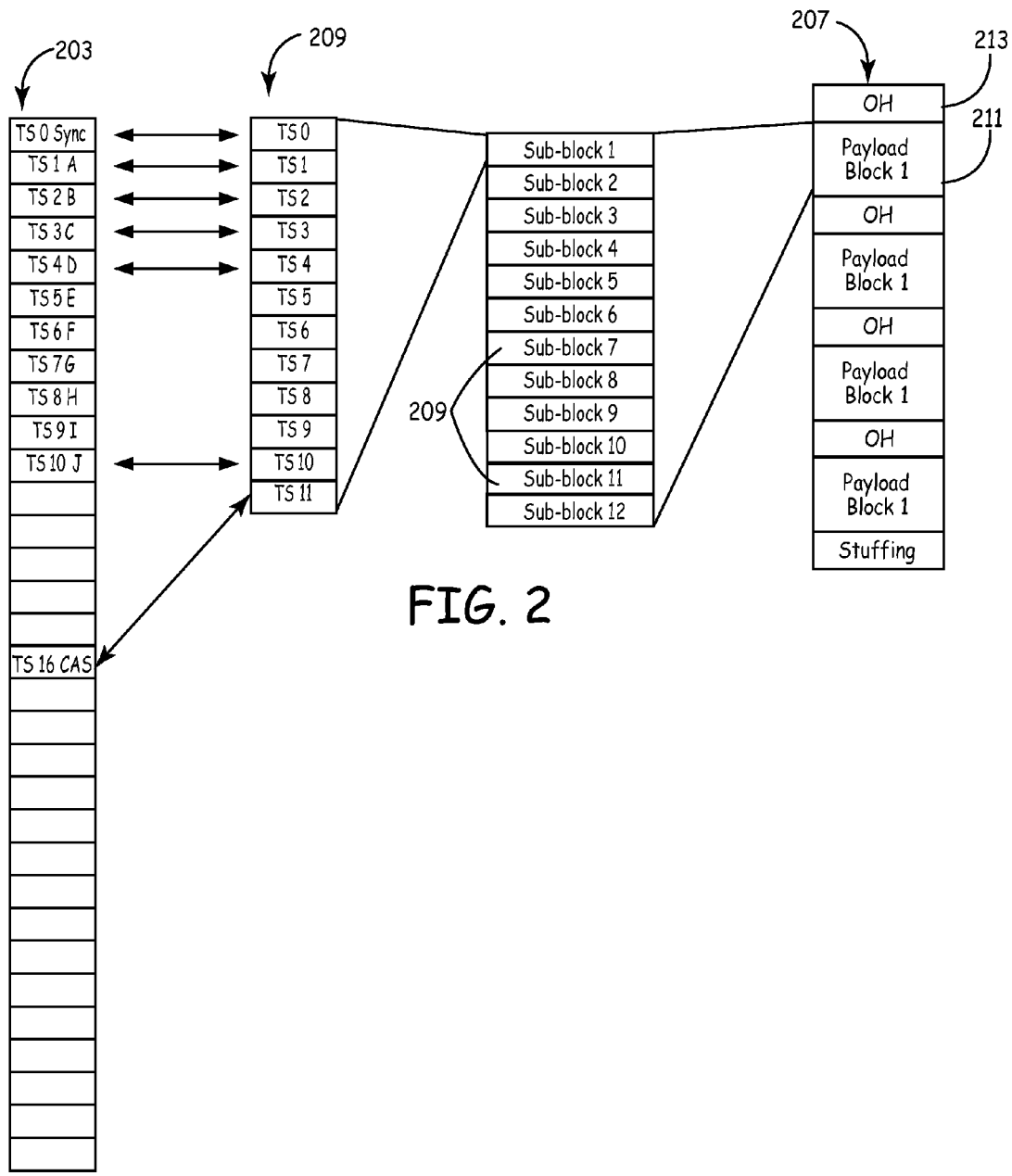
FIG. 2 depicts mapping of an exemplary TDM frame to a DSL frame.

The exemplary fractional E1 frame 203 in FIG. 2 uses 10 timeslots (timeslots 1-10) for user data. However, it is to be understood that other amounts of timeslots can be used in other fractional E frames. Timeslot 0 is referred to as the synchronization timeslot and is used for signaling the start of the frame. In addition, timeslot 0 can be used to carry a multi-frame Cyclic Redundancy Check (CRC) and/or to send and receive alarms. Timeslot 16 is referred to as the Channel Associated Signaling (CAS) timeslot and is used for providing CAS information as known to one of skill in the art.

Each remote unit 106 maps the received fractional E1 frame 203 to a corresponding sub-block 209 of a DSL frame 207. In some embodiments, as shown in FIG. 2, each remote unit 106 maps timeslot 16 to the timeslot after the last timeslot used for user data (e.g. timeslot 11 in this example). In particular, each remote unit 106 does not map the empty timeslots in the fractional E frame 203 to the sub-block 209 (e.g. timeslots 11-15 and 17-31 in the example of FIG. 2). Additional details of CAS timeslot remapping are found in the '801 application. Each sub-block 209 includes 12 timeslots in this example. The number of timeslots required for the fractional E1 timeslots determines the sub-block size. Each block 211 in the DSL frame 207 includes 12 sub-blocks 209 and each block 211 is separated by a header 213.

Thus, through the procedure described above, the fractional E1 frame is transported to the central office 102 over DSL links 114. In this exemplary embodiment, the Global Standard High-Bit-Rate Digital Subscriber Line (G.SHDSL), defined in ITU G.991.2 standard, is used to transport data from the remote units 106 to the central office 102. However, it is to be understood that other DSL variants can be used in other embodiments.

Each remote unit 106 is coupled to a corresponding central unit 108 (labeled as STU-C). At the central office 102, the corresponding central unit 108 receives the DSL frame 209 via the DSL link 114 and extracts the remapped fractional E1 timeslots from the DSL frame 209. Each central unit 108 then maps the E1 timeslot 16 back to its original location and inserts the empty timeslots (e.g. timeslots 11-15 and 17-31 in this example) to re-create the fractional E1 frame 203. In other words, each central unit 108 reverses the mapping performed in the corresponding remote unit 106. Each remote unit 108 then outputs the fractional E1 frame 203 via its E1 port connector 118 to a multiplexer card 120.

Multiplexer card 120 includes a plurality of E1 ports 122-1 . . . 122-N. One of the E1 ports 122 is labeled the primary E1 port and is used to connect to the TDM switch 110. In this example E1 port 122-1 is the primary E1 port. Also, in this example, multiplexer card 120 includes 5 E1 ports. However, it is to be understood that more or fewer E1 ports can be used in other embodiments. The combined number of timeslots for user data received at the E1 ports 122-2 . . . 122-N connected to the central units 108 may not exceed the E1 port capacity of the primary E1 port 122-1 (30 timeslots in this example). Hence, each E1 port 122-2 . . . 122-N can have a configured bandwidth up to the maximum available on an E1 port (i.e., from 1-30 timeslots) as long as the total of all the timeslots is not greater than 30 timeslots. The timeslots are allocated in blocks from the primary E1 port 122-1. A block that begins after timeslot 1 on the primary E1 port 122-1 is remapped on the corresponding fractional E1 port 122 connected to a central unit 108, as shown in the example in FIG. 3. The corresponding CAS signaling is also adjusted as shown in FIG. 3.

Figure 3:
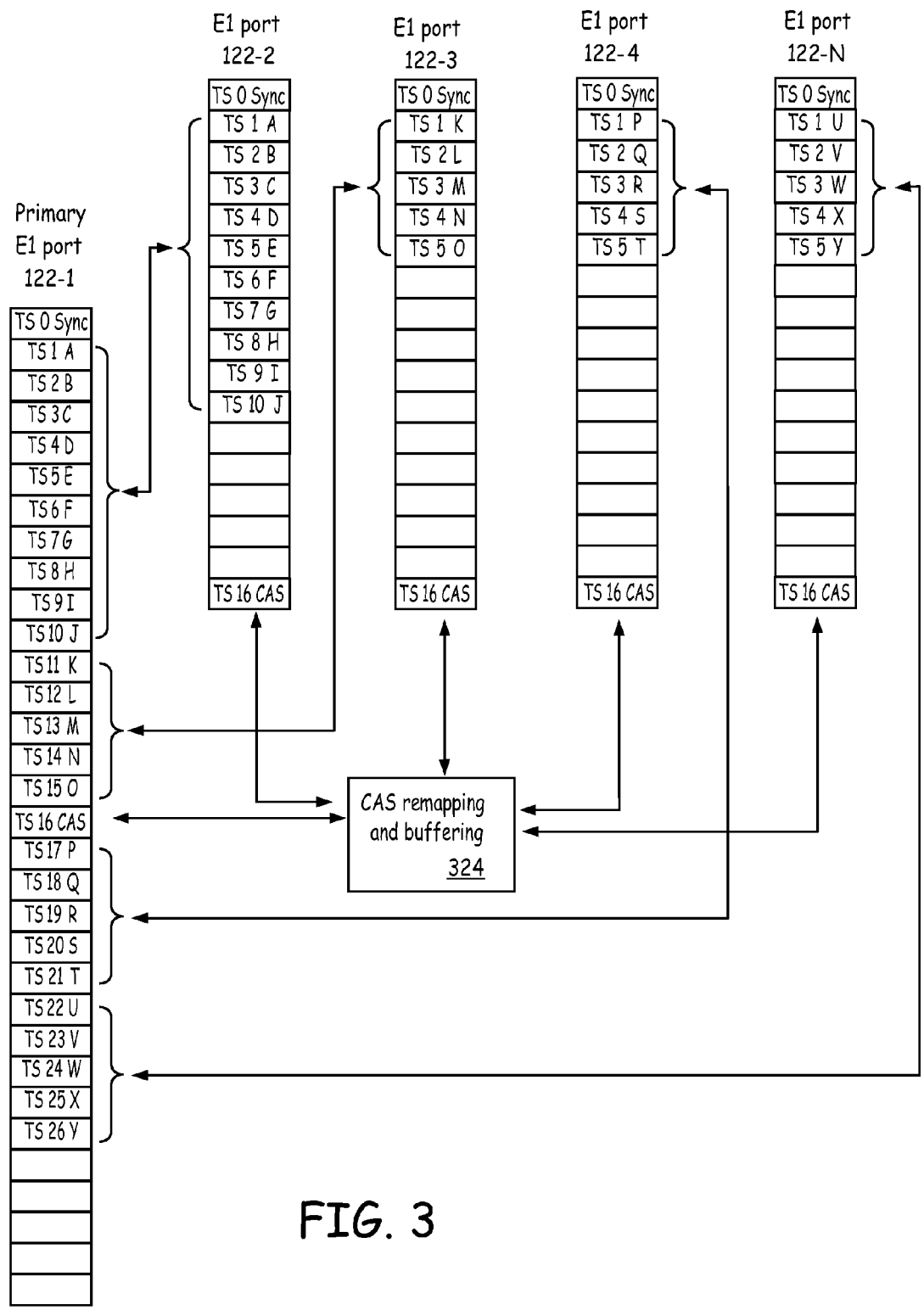
FIG. 3 depicts mapping of exemplary fractional TDM frames to a single TDM frame.

In the example in FIG. 3, four fractional E1 frames are coupled to the E1 ports 122-2 . . . 122-N (also referred to herein as secondary E1 ports). In this example, the fractional E1 frame corresponding to E1 port 122-2 is assigned 10 timeslots and the fractional E1 frame corresponding to each of E1 ports 122-3 . . . 122-N is assigned 5 timeslots for a combined total of 25 timeslots. As shown in the example in FIG. 3, timeslots 1-10 from E1 port 122-2 are mapped to timeslots 1-10 on the primary E1 port 122-1. Timeslots 1-5 from E1 ports 122-3, 122-4, and 122-N are mapped to timeslots 11-15, 17-21, and 22-26, respectively, on the primary E1 port 122-1. In addition, the timeslot 16 from each of the E1 ports 122-2 . . . 122-N is buffered and mapped at CAS remapping block 424 into a single timeslot 16 sent on the primary E1 port 122-1. Similarly, the multiplexer card 120 is responsible for terminating the timeslot 0 from each fractional E1 frame received on the secondary E1 ports 122-2 . . . 122-N. The multiplexer card 120 generates and transmits a single timeslot 0 over the primary E1 port 122-1. In addition, the multiplexer card 120 terminates the timeslot 0 from each E1 frame received on the primary E1 port 122-1. The multiplexer card 120 then generates a timeslot 0 for each of the fractional E1 frames transmitted over secondary E1 ports 122-2 . . . 122-N.

The E1 multiplexer card 120 is configured a priori to know how many timeslots are to be received on each of the E1 ports 122-2 . . . 122-N. Thus, when an E1 frame is received from the TDM switch 110 on the primary port 122-1, the E1 multiplexer card 120 is able to identify the CAS signaling information which is relevant to each block of timeslots assigned a priori to the E1 ports 122-2 . . . 122-N. The multiplexer card 120 then separates the received E1 frame into the assigned blocks and maps the assigned blocks to the corresponding timeslots on each E1 port 122-2 . . . 122-N. The multiplexer card 120 also maps the corresponding CAS signaling information to the correct timeslot 16 of each E1 port 122-2 . . . 122-N. The fractional E1 frames are then sent to the corresponding central unit 108.

The processing described above to deliver a fractional E frame from the end user equipment 104 to the TDM switch 110 is reversed to provide a fractional E frame from the TDM switch 110 to the end user equipment 104. For example, each central unit 108 maps the fractional E1 frame to a DSL frame. In particular, each central unit 108 remaps the E1 timeslot 16 (also referred to as the CAS timeslot) for each fractional TDM frame received from the multiplexing card 120 to the timeslot after the last timeslot used for user data as described above. The corresponding remote unit 106 extracts the factional E1 timeslots and remaps the E1 timeslot 16 to its original location and provides the fractional E1 frame to the corresponding end user equipment 104.

Hence, system 100 reduces the cost of an E-carrier service by providing multiple E1 connections to remote locations from a single E1 connection at the central office. In addition, system 100 enables the delivery of the fractional E frames without requiring a redesign of the remote units 106 or the central units 108. Customers which do not require a full E1 frame are, thus, provided E1 service over an existing network infrastructure through the addition of the functionality provided by the E1 multiplexer card 120. Thus, multiple customers are able to connect to an E1 port while only consuming one E1 port at the central office TDM switch 110.

Figure 4:
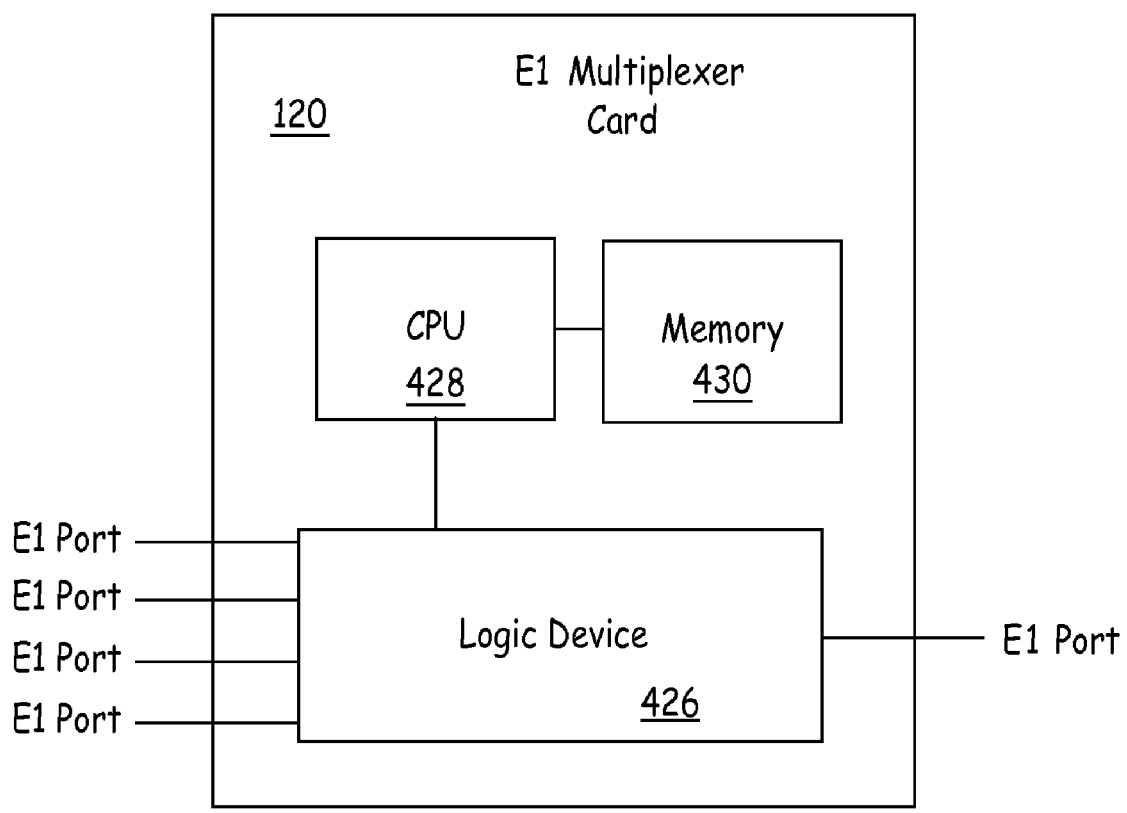
FIG. 4 is a block diagram of one embodiment of a multiplexing card.

FIG. 4 is a block diagram of one embodiment of an E1 multiplexer card 120. The exemplary E1 multiplexer card 120 in FIG. 4 includes a primary E1 port 422-1 and four additional E1 ports 422-2 . . . 422-N. The E1 ports 422 are coupled to a logic device 426. The logic device 426 is responsible for switching timeslots between the primary E1 port 422-1 and the other E1 ports 422-2 . . . 422-N described above. The logic device 426 is also responsible for the CAS signaling remapping of timeslots 16 and generation/termination of timeslot 0, as described above.

In this example, the logic device 426 is an FPGA that is controlled by a processing unit 428. The processing unit 428 is responsible for configuration, status and error handling of the E1 multiplexer card 120. For example, the processing unit 428 configures the FPGA 426 for the specific number of timeslot blocks to be used and the number of timeslots to be allocated to each timeslot block. The processing unit 428 is communicatively coupled to a memory 430, which, in some embodiments, stores a menu that includes the options for configuring the number of timeslot blocks and the number of timeslots allocated to each timeslot block.

The memory 430 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In addition, in some embodiments, processor-readable instructions are tangibly embodied on the memory 430 and, when executed by the processing unit 428, the processor-readable instructions cause the processing unit 428 to perform the configuration, status and error handling of the E1 multiplexer card 120. Although the logic device 426 is implemented as an FPGA in this example, it is to be understood that in other embodiments, other programmable logic devices are used such as a complex programmable logic device (CPLD), a field programmable object array (FPOA), or a digital signal processor (DSP). Additionally, in some embodiments, the logic device 426 is implemented as an application specific integrated circuit (ASIC).

Figure 5:
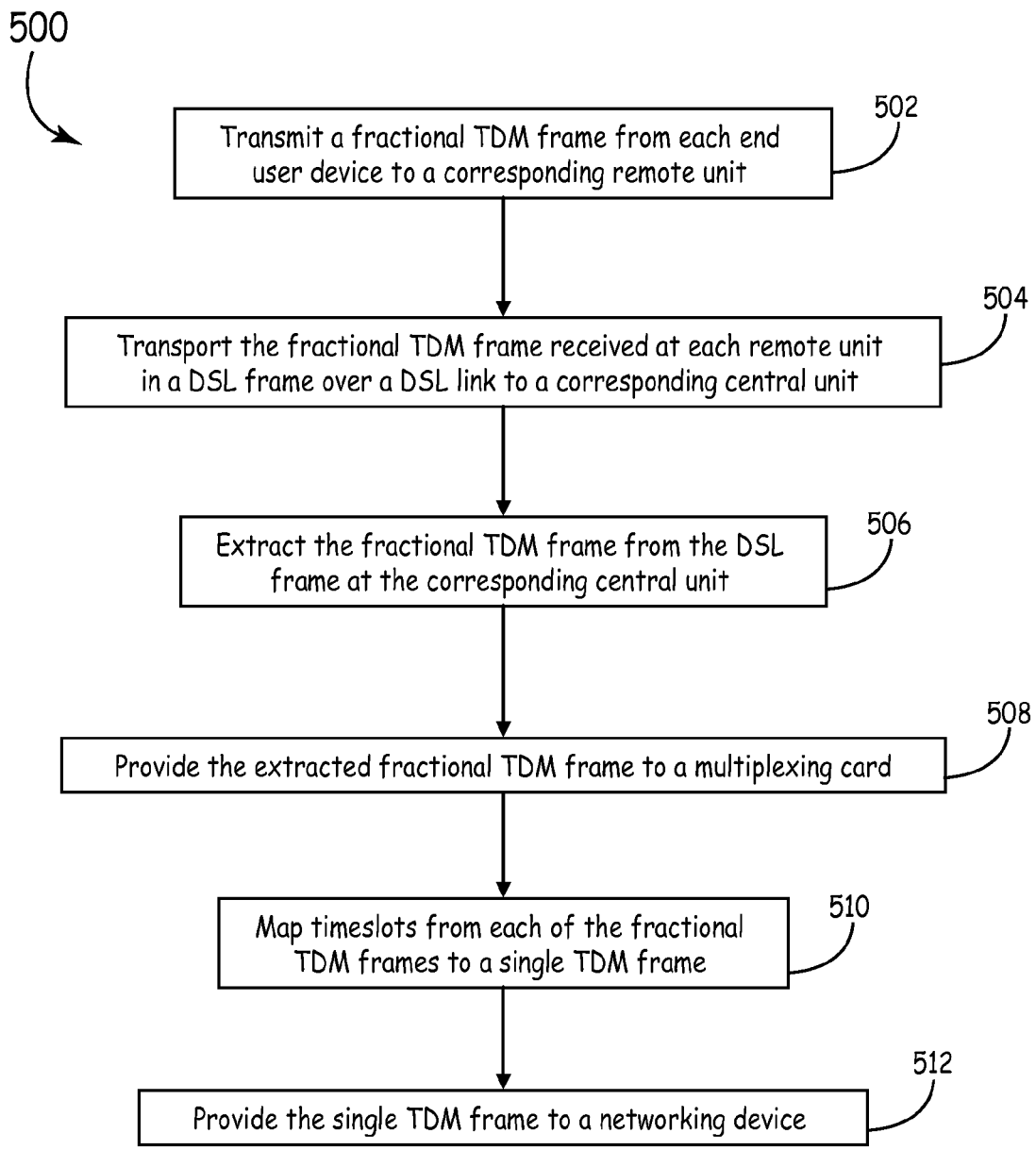
FIG. 5 is a flow chart depicting one embodiment of a method of communicating fractional TDM frames.

FIG. 5 is a flow chart depicting one embodiment of a method 500 of communicating fractional TDM frames. At block 502, a fractional TDM frame is transmitted from each of a plurality of end user devices (e.g. end user device equipment 104) to a corresponding remote unit (e.g. remote units 106). For example, the fractional TDM frame from one end user device may use 10 timeslots, whereas the fractional TDM frame from another end user device may use 5 timeslots. At block 504, the fractional TDM frame received at each remote unit is transported in a DSL frame over a DSL link (e.g. DSL links 114) to a corresponding central unit (e.g. central unit 108). Transporting the TDM frame includes mapping the CAS timeslot to a timeslot following the last timeslot carrying user data as described above.

At block 506, the fractional TDM frame is extracted from the DSL frame at the corresponding central unit. Extracting the fractional TDM frame includes remapping the CAS timeslot to its original location and inserting the empty timeslots as described above. At block 508, the extracted fractional TDM frame is provided to a multiplexing card (e.g. multiplexing card 120). At block 510, the multiplexing card maps timeslots from each of the fractional TDM frames received from the central units to a single TDM frame as described above. At block 512, the single TDM frame is provided to the networking device.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A multiplexing card for fractional time division multiplex (TDM) frames, the multiplexing card comprising:
   a primary TDM port over which TDM frames are communicated to and from a networking device,
   a plurality of secondary TDM ports over each of which fractional TDM frames are communicated to and from a plurality of digital subscriber line (DSL) units, wherein the maximum number of available timeslots in each of the fractional TDM frames is equal to the maximum number of available timeslots in the TDM frame communicated over the primary TDM port; and
   a logic device coupled between the primary TDM port and the plurality of secondary TDM ports, wherein the logic device is operable to map timeslots from each of the fractional TDM frames received over the plurality of secondary TDM ports to corresponding timeslots in a TDM frame communicated over the primary TDM port, and to map each of a plurality of blocks of timeslots in a TDM frame received over the primary TDM port to timeslots in a corresponding fractional TDM frame transmitted over one of the plurality of secondary TDM ports;
   wherein the combined number of timeslots containing user data in the fractional TDM frames received over the plurality of secondary TDM ports is less than or equal to the maximum number of available timeslots in the corresponding TDM frame communicated over the primary TDM port;
   wherein the logic device is further configured to buffer and map signaling information in a respective Channel Associated Signaling (CAS) timeslot from each of the fractional TDM frames received over the plurality of secondary TDM ports to a single CAS timeslot in the corresponding TDM frame communicated over the primary TDM port based, at least in part, on the mapping of timeslots containing user data between the fractional TDM frames and the TDM frame communicated over the primary TDM port.

2. The multiplexing card of claim 1, wherein the logic device is a programmable logic device and the multiplexing card further comprises a processing unit to control configuration of the programmable logic device.

3. The multiplexing card of claim 2, wherein the programmable logic device is one of a field programmable gate array and a field programmable object array.

4. The multiplexing card of claim 1, wherein the TDM frames are structured according to an E-carrier protocol.

5. The multiplexing card of claim 1, wherein the TDM frames are structured according to a T-carrier protocol.

6. The multiplexing card of claim 1, wherein the logic device is further operable to remove a synchronization timeslot from each of the fractional TDM frames received over the plurality of secondary TDM ports, and to generate a synchronization timeslot for each of the plurality of blocks of timeslots mapped to a corresponding fractional TDM frame transmitted over one of the plurality of secondary TDM ports.

7. The multiplexing card of claim 1, wherein the plurality of secondary TDM ports comprises four secondary TDM ports.

8. A communication system comprising:
a plurality of end user devices having a time division multiplex (TDM) port;
a plurality of remote units having a TDM port, the TDM port in each of the plurality of remote units coupled to the TDM port in one of the plurality of end user devices,
a plurality of central units having a TDM port, each of the plurality of central units coupled to one of the plurality of remote units via a digital subscriber line (DSL) link, wherein each remote unit is operable to transport, over the DSL link to the corresponding central unit, a fractional TDM frame received from the corresponding end user device;
a networking device to transmit and receive TDM frames, wherein the maximum number of available timeslots in each of the TDM frames transmitted and received by the network device is equal to the maximum number of available timeslots in each of the fractional TDM frames; and
a multiplexing card having a primary TDM port coupled to the networking device and a plurality of secondary TDM ports each coupled to the TDM port in one of the plurality of central units, wherein the multiplexing card is operable to map timeslots from each of the fractional TDM frames received from the plurality of central units to corresponding timeslots in a TDM frame transmitted over the primary TDM port to the networking device, and to map each of a plurality of blocks of timeslots in a TDM frame received over the primary TDM port from the networking device to corresponding timeslots in a fractional TDM frame transmitted over one of the plurality of secondary TDM ports to one of the plurality of central units;
wherein the combined number of timeslots mapped from the plurality of fractional TDM frames is less than or equal to the maximum number of available timeslots in the corresponding TDM frame transmitted over the primary TDM port;
wherein the multiplexing card is further configured to buffer and map signaling information in a respective Channel Associated Signaling (CAS) timeslot from each of the fractional TDM frames received over the plurality of secondary TDM ports to a single CAS timeslot in the corresponding TDM frame communicated over the primary TDM port based, at least in part, on the mapping of timeslots containing user data between the fractional TDM frames and the TDM frame communicated over the primary TDM port.

9. The communication system of claim 8, wherein the plurality of secondary TDM ports in the multiplexing card comprises four secondary TDM ports.

10. The communication system of claim 8, wherein the multiplexing card is operable to remove a synchronization timeslot from each of the fractional TDM frames received over the plurality of secondary TDM ports, and to generate a synchronization timeslot for each of the plurality of blocks of timeslots mapped to a corresponding fractional TDM frame transmitted over one of the plurality of secondary TDM ports.

11. The communication system of claim 8, wherein the TDM frames are structured according to an E-carrier protocol.

12. The communication system of claim 8, wherein the TDM frames are structured according to a T-carrier protocol.

13. The communication system of claim 8, wherein each of the plurality of remote units is operable to map a Channel Associated Signaling (CAS) timeslot to a timeslot immediately following the last timeslot carrying user data prior to transporting the fractional TDM frame over the DSL link to the corresponding central unit; and
wherein the corresponding central unit is operable to map the CAS timeslot to its original location in the fractional TDM frame.

14. The communication system of claim 8, wherein the DSL link is configured according to the Global.Standard High-Bit-Rate Digital Subscriber Line (G.SHDSL) standard.

15. A method of communicating fractional TDM frames, the method comprising:
transmitting a fractional TDM frame from each of a plurality of end user devices to a corresponding remote unit;
transporting the fractional TDM frame received at each remote unit in a digital subscriber line (DSL) frame over a DSL link to a corresponding central unit;
extracting the fractional TDM frame from the DSL frame at each central unit;
providing the extracted fractional TDM frame from each central unit to a multiplexing card;
mapping a subset of timeslots from each of the fractional TDM frames to corresponding timeslots in a single TDM frame in the multiplexing card, the subset of timeslots from each fractional TDM frame being less than the total number of available timeslots for the respective fractional TDM frame, wherein the total number of available timeslots in each of the fractional TDM frames is equal to the total number of available timeslots in the single TDM frame; and
providing the single TDM frame to a networking device;
wherein mapping the subset of timeslots from each of the fractional TDM frames includes buffering and mapping signaling information in a respective Channel Associated Signaling (CAS) timeslot from each of the fractional TDM frames to a single CAS timeslot in the corresponding single TDM frame based, at least in part, on mapping timeslots containing user data from the fractional TDM frames to the single TDM frame.

16. The method of claim 15, wherein transporting the fractional TDM frame received at each remote unit in a digital subscriber line (DSL) frame over a DSL link comprises:
mapping a Channel Associated Signaling (CAS) timeslot to a timeslot immediately following the last timeslot carrying user data; and
wherein extracting the fractional TDM frame from the DSL frame at each central unit includes mapping the CAS timeslot to its original location.

17. The method of claim 15, wherein mapping timeslots from each of the fractional TDM frames to timeslots in a single TDM frame comprises:
removing the synchronization timeslot from each of the fractional TDM frames; and
mapping the Channel Associated Signaling (CAS) timeslot from each of the fractional TDM frames to a single CAS timeslot in the single TDM frame.

18. The method of claim 15, wherein each of the fractional TDM frames is configured according to an E-carrier protocol.

* * * * *